United States Patent
Miyamoto et al.

(10) Patent No.: US 6,217,963 B1
(45) Date of Patent: Apr. 17, 2001

(54) SEAMLESS TUBULAR COMPOSITE FILM AND METHOD FOR PRODUCING THE SAME

(75) Inventors: Tsuneo Miyamoto; Junya Kanetake; Naoki Nishiura, all of Moriyama; Nobuaki Kobayashi, Konan; Takashi Kuraoka, Kusatsu, all of (JP)

(73) Assignee: Gunze Limited, Ayabe (JP)

( * ) Notice: Subject to any disclaimer, the term of this patent is extended or adjusted under 35 U.S.C. 154(b) by 0 days.

(21) Appl. No.: 09/064,326

(22) Filed: Apr. 22, 1998

(30) Foreign Application Priority Data

Apr. 22, 1997 (JP) .................................................. 9-120194

(51) Int. Cl.[7] .............................. B32B 27/32; B32B 31/30
(52) U.S. Cl. ...................... 428/36.91; 138/137; 138/141; 264/209.3; 264/209.4; 264/209.5; 264/288.4; 264/290.4; 264/331.14; 264/331.15; 428/215; 428/421; 428/422; 428/473.5
(58) Field of Search ................................. 428/36.91, 421, 428/473.5, 422, 215; 138/137, 141; 264/209.3, 209.4, 209.5, 331.14, 331.15, 288.4, 290.2

(56) References Cited

U.S. PATENT DOCUMENTS 5,411,779 * 5/1995 Nakajima et al. ................. 428/36.91
5,582,886 * 12/1996 Kitajima et al. ................... 428/36.91
5,759,655   6/1998 Kitajima et al. ................... 428/36.91
5,803,887 * 9/1998 Fukunaga ............................. 492/59

FOREIGN PATENT DOCUMENTS

H5-212837   8/1993 (JP) .

* cited by examiner

Primary Examiner—Ellis Robinson
Assistant Examiner—Sandra M. Nolan
(74) Attorney, Agent, or Firm—Hardaway/Mann IP Group; Nexsen Pruet Jacobs & Pollard, LLC

(57) ABSTRACT

A seamless tubular composite film wherein a seamless tubular film comprising fluororesin with a film thickness of 5–20 μm stretched 2–10% in circumferential direction is fitted on the outside of a seamless tubular film comprising a thermosetting polyimide resin, or the precursor polyamic acid and heated at 200–400° C. for anchorage. In addition, in order to give thermal conductivity and antistatic properties leading to inhibition reduction of heating time and inhibition of adhesion of dirt, boron nitride and compatible thermal conductive agents may be dispersed in the polyimide resin, and carbon black and like electric conductive agent may be dispersed in fluororesin. The film is useful as toner fusing member, such as in electrophotographic copying machines and in laser printing.

8 Claims, 1 Drawing Sheet

SEAMLESS TUBULAR COMPOSITE FILM AND METHOD FOR PRODUCING THE SAME

FIELD OF THE INVENTION

The invention relates to an improved seamless tubular composite film comprising a thermosetting polyimide resin as base material and a method of production thereof.

BACKGROUND ART

For example, an electrophotographic copying machine is equipped with a heat-fusing member (roll or belt) to hot-press with a heating roller a toner image transferred from sensitizing drum to paper and like subject to be transferred. The heat-fusing member requires, for example, the following functions:

sufficient resistance to temperature at which toner image is melted and fixed on a subject;

good release properties from toner image leading to free of toner on fusing surface;

rapid elevation of fusing surface to a required temperature;

free of expansion and contraction and strength reduction when heated at high temperature for a long period of time; and good chemical resistance.

Japanese unexamined patent publication H5-212837 (hereinafter referred to as "reference A") Japanese unexamined patent publication H7-178741 (hereinafter referred to as "reference B") and Japanese unexamined patent publication H7-246671 (hereinafter referred to as "reference C") disclose a fusing member with necessary functions as shown above.

Reference A relates to a composite tube prepared by fitting a tubular fluororesin film (hereinafter tube B) on a tubular thermoplastic polyimide film (hereinafter tube A), followed by welding them at, for example, 280–400° C. It is found that the composite tube of reference A is insufficient in the following points.

For example, welding tube A on the outside of which tube B is fitted may cause a little deformation to make the composite tube out of round. When the composite tube is used as fusing member, each heating on fusing causes only a little dimensional change (contraction) which leads to large dimensional change in long-term use. In addition, entire strength (Young's modulus) is gradually decreased. As a result, the composite film is estimated as insufficient durability.

In contrast, references B and C disclose a composite tubular material wherein a tubular fluororesin layer is formed on the surface of polyimide resin tube directly or indirectly (primary coat is formed separately). The fluororesin coating layer is formed by dipping the resin in a dispersion, spraying, roll-coating and like coating means. The polyimide/fluororesin composite tube prepared by such coating means has the disadvantages of poor surface smoothness of fluororesin layer, pinhole which is likely to be generated, and ununiformity of film thickness. The disadvantages result in incapability of heat-fusing toner image on a subject to be transferred uniformly with superior image quality leading to dirty non-image portion by toner.

According to said coating means, there is a problem that weak adhesion on the surface of polyimide surface leads to peeling of fluororesin layer, in particular, in long-term use. Peeling of fluororesin layer also leads to removal of toner on the surface of subject during heat-fusing.

BRIEF DESCRIPTION OF THE DRAWINGS

In FIG. 1, 1 is a seamless tubular composite film, 2 is a ceramic heater, 3 is a back-up roll, 4 is a toner image paper, 5 is a rotating shaft.

DISCLOSURE OF THE INVENTION

Figure 1:
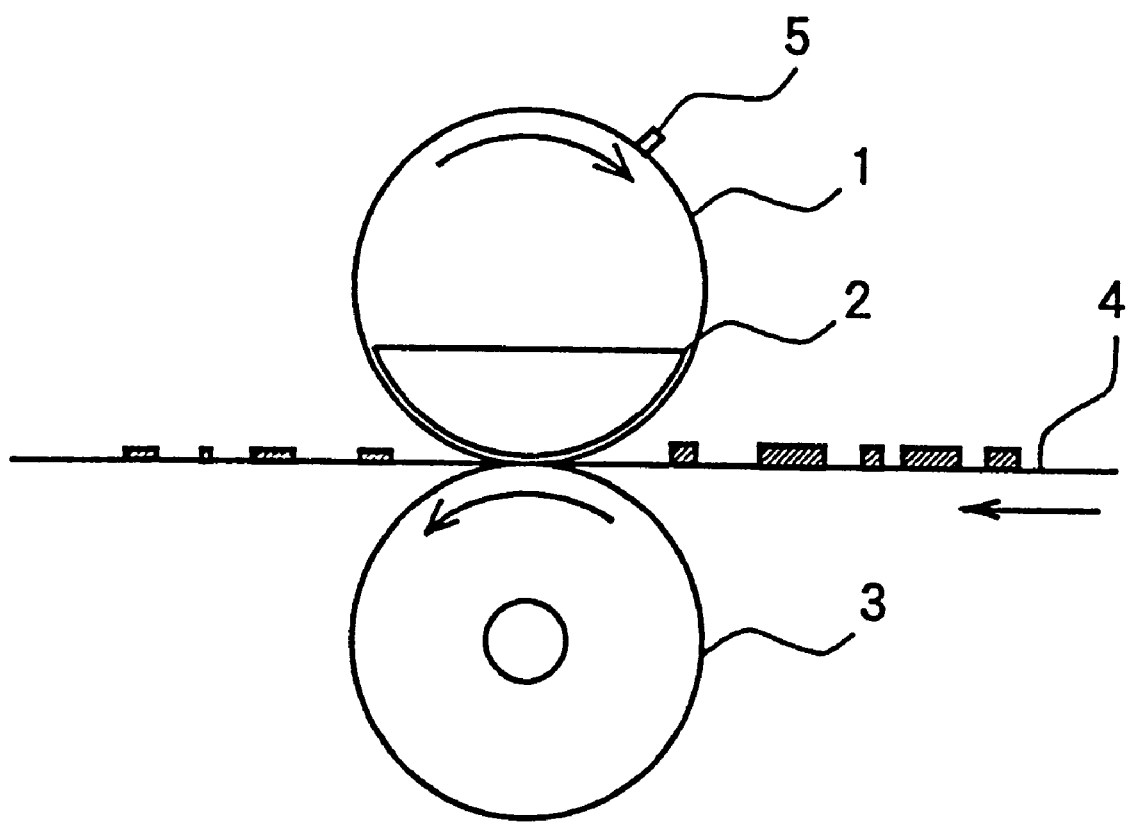
FIG. 1 demonstrates an example of side view of a fusing roll mechanism.

Thus, the invention relates to a seamless tubular composite film, a method for production thereof and a method for use thereof.

Item 1. A seamless tubular composite film characterized in that a seamless tubular film (hereinafter referred to as "base film") mainly comprising fluororesin with a film thickness of 5–20 μm (hereinafter referred to as "outer layer film") is fitted and fixed on the outside of a seamless tubular film mainly comprising a thermosetting polyimide resin.

Item 2. The seamless tubular composite film as defined in item 1 wherein the seamless tubular film mainly comprising a thermosetting polyimide resin comprises thermal conductive inorganic powder dispersed therein, and the seamless tubular film mainly comprising fluororesin comprises electrical conductive powder dispersed therein.

Item 3. The seamless tubular composite film as defined in item 1 wherein the seamless tubular film mainly comprising a thermosetting polyimide resin has a thickness of 10–100 μm.

Item 4. The seamless tubular composite film as defined in item 1 wherein the seamless tubular film mainly comprising fluororesin with a film thickness of 5–20 μm is a seamless tubular film with a film thickness of 7–15 μm mainly comprising fluorine-containing copolymer resin having a melting point of 250–400° C.

Item 5. The seamless tubular composite film as defined in item 4 wherein fluorine-containing copolymer resin having a melting point of 250–400° C. is a copolymer of tetrafluoroethylene and hexafluoropropylene or perfluoroalkylvinylether.

Item 6. The seamless tubular composite film as defined in item 1 wherein the seamless tubular film mainly comprising fluororesin with a film thickness of 5–20 μm is stretched 2–10% in at least circumferential direction Item 7. The seamless tubular composite film as defined in item 2 wherein thermal conductive inorganic powder is selected from the group consisting of boron nitride, aluminum oxide, beryllium oxide and aluminum nitride.

Item 8. The seamless tubular composite film as defined in item 2 wherein the electrical conductive powder is carbon black or a blend of carbon black and metallic powder.

Item 9. A method for producing a seamless tubular composite film characterised in that the method comprises fitting a seamless tubular film mainly comprising fluororesin with a film thickness of 5–20 μm which is obtained by extrusion molding with a ring die on the outside of a seamless tubular film mainly comprising a polyamic acid of thermosetting polyimide resin which is obtained by centrifugal casting of liquid material mainly comprising the polyamic acid, and heating it at 200–400° C. for fixation by way of imide-ring closure and composite formation.

Item 10. The method for producing a seamless tubular composite film as defined in item 9 characterised in that the method comprises fitting a seamless tubular film comprising fluororesin which is obtained by extrusion molding of fluororesin containing 4–15% by weight of electrical conductive powder with a ring die on the outside of a seamless tubular film comprising a polyamic acid of thermosetting polyimide resin which is obtained by centrifugal casting of liquid material comprising the polyamic acid of thermosetting polyimide resin and 5–30% by weight of thermal conductive powder, and heating it at 200–400° C. for fixation with imide-ring closure to form composite.

Item 11. An electrophotographic copying machine provided with the seamless tubular composite film as defined in item 1 in a fusing member for heating and fusing an image formed by toner transferred on subject.

The invention will be described below in detail.

According to the invention, selection of thermosetting base film as base material of seamless tubular composite film exerts effects on free of strength (Young's modulus and the like) reduction, and expansion and contraction under conditions of continuous heating at high temperature and continuous repeat of heating and cooling, which may not be obtained by conventional resin, such as thermoplastic polyimide. The base film of the invention is sealed to the outer layer film forming outer layer completely, uniformly and firmly without clearance. This is based on very high degree of smoothness of surface of the base film and accuracy of thickness, and also free of expansion and contraction of base film during heating for anchorage. Thickness of base film is not specifically limited as long as the film is flexible to flexing action. The thickness may be as thin as about 10 $\mu$m because of superior strength to other resins, generally 10–100 $\mu$m, preferably 20–60 $\mu$m.

Structure and production procedure of thermosetting polyimide resins are known. The structure is a direct bonding of imide group in molecular main chain with organic group, which is a repeating unit for polymerization.

The organic groups include aliphatic groups and aromatic groups. Aromatic groups free of reduction of strength at high operating temperature are preferable. Aromatic groups include phenyl group, naphtyl group, diphenyl-type group (which includes groups having two phenyl groups bonded via single bond, methylene, ethylene, propylene, carbonyl group and oxygen atom).

In general, the method for production thereof comprises reacting a tetracarboxylic dianhydride such as pyromellitic dianhydride, 2,2',3,3'-biphenyltetracarboxyl ic dianhydride, 3,3',4,4'-benzophenonetetracarboxylic dianhydride, bis(2,3-dicarboxyphenyl)methanoic dianhydride with an organic diamine, such as p-phenylenediamine, 4,4'-diaminodiphenyl, 4,4'-diaminodiphenylmethane in equivalent amount in organic polar solvent, such as N-methylpyrrolidone, dimethylacetoamide and dimethylformamide at equal to or less than room temperature to form a polyamic acid which is formed into seamless tubular film. Finally, the film is heated (generally 200–450° C.) for imide-ring closure to be converted into insoluble and infusible polyimide, i.e., base film.

The resin in base film, which comprises imide group and organic group as shown above, includes thermosetting polyamideimide resin comprising amide group as repeat unit in main chain. With respect to the resin, seamless tubular film may be obtained by two steps in the same manner as above except that tricarboxylic anhydride is used in place of said tetracarboxylic dianhydride.

The outer layer film as outer layer is fitted on the outside of said base film and anchored to form a desired seamless tubular composite film.

Since the separately obtained outer film is fitted on the outside of the base film to form an outer layer, a surface of outer layer which may not be obtained by conventional coating method may be formed. The surface of outer layer is a smooth surface like specular surface with uniform thickness. When toner image on subject to be transferred is pressed with heat for fusing, the toner image on subject is fused faithfully and securely resulting in reproduction of toner image with high image quality. Since minute toner image does not remain on outer layer film resulting in free of offset grime after repeated use for a long period of term.

Thickness of outer layer film is preferably about 5–20 $\mu$m, more preferably about 7–15 $\mu$m. When the outer layer is too thin, the layer become partially thinner by wear due to decrease of durability in long-term use leading to peeling of the thinner portion. In contrast, too much film thickness requires more time to reach a desired surface temperature, resulting in decrease of heating efficiency.

The clearance between base film and outer layer film fitted on the outside of the base film is preferably equal to or a little smaller than shrinkage factor of outer layer film in circumferential direction. Anchorage is preferably conducted by shrinkage. This may be accomplished by fitting the outer layer film on the outside of base film, followed by heating the composite at a temperature high enough to shrink or fuse of the outer layer film.

Since adhesive may be used for anchorage, anchorage means are not limited.

Fluororesin is not limited, but preferably fluorine-containing copolymer having a melting point of 250–400° C. because of easy production of a seamless tubular film with high quality (accuracy of thickness, surface smoothness) and easy and complete anchorage to base film. Examples of the copolymer are a copolymer of tetrafluoroethylene and perfluoroalkylvinylether, a terpolymer of tetrafluoroethylene, hexafluoropropylene and perfluoroalkylvinylether, a copolymer of tetrafluoroethylene and ethylene, a copolymer of tetrafluoroethylene and perfluorosulfonylfluoridevinyl-ether. The copolymer of tetrafluoroethylene and perfluoroalkylvinylether, and terpolymer of tetrafluoroethylene, hexafluoropropylene and perfluoroalkylvinylether are preferable in heat-resisting properties and release characteristics of toner image.

Item 2 will be subsequently described below. With respect to item 2, thermal conductivity and antistatic properties are provided to seamless tubular composite film of item 1 for high performance. Thermal conductivity is given by dispersing thermal conductive inorganic powder in said base film. Antistatic properties are given by dispersing electrical conductive powder in outer layer film.

It is preferable that dispersion of said inorganic powder gives thermal conductivity without changing properties of base film, and that dispersion is easy with no variation with time. Inorganic powder content is preferably 5–30% by weight based on solid matter. Inorganic powder may be selected from inorganic powders with thermal conductivity, preferably one or more selected from powders of boron nitride, aluminum oxide, beryllium oxide and aluminum nitride.

Form of inorganic powder is not specifically limited to, but includes circular form, ellipsoidal form and rectangular form. Size (average particle diameter) thereof is about 0.01–3 $\mu$m, preferably 0.1–1 $\mu$m. Average particle diameter may be determined by BET specific surface area.

It is preferable that electrical conductive powder gives antistatic properties without changing properties of outer layer film, and that dispersion is easy with no variation with time. Electrical conductive powder is mixed about 4–15% by weight based on solid matter. Typical electrical conductive powder is carbon black. To obtain continuous antistatic properties (about $10^8$–$10^{13}$ $\Omega/\square$ in surface resistivity), carbon black is preferably combined with metallic powder. The metallic powder includes nickel, copper, aluminum, silver and zinc oxide.

"Seamless" means that no seam exists. Seamless like film prepared by seaming both ends of a sheet of film is not included in the invention due to lack of effects of the invention.

A method for producing seamless tubular composite film is described below.

Polyamic acid film, which is a precursor film of base film, is produced as shown below. Liquid material of polyamic acid, which is a precursor of polyimide, i.e., polyamic acid dissolved in organic polar solvent is prepared. Viscosity of the solution is preferably adjusted for smooth centrifugal casting. The viscosity is preferably about 10–1,200 cps. For smoother molding, a small amount of surface active agent, for example, anionic or nonionic flouorine-containing compounds (eg. Type EF-104, 351 in EF-TOP, Mitsubishi Materials Corp.) may be added.

The liquid polyamic acid thus prepared is subjected to centrifugal casting with centrifugal casting machine. The casting machine comprises rotating drum, heating means and rotating means of the drum. Inside surface of the drum is planished. Ring flames for inhibiting leakage of liquid are located at both ends of the inner surface.

With respect to the rotating means, rotating drum is generally positioned on two or more revolving rollers, which are rotated by motor. With respect to a preferable embodiment of the heating means, the revolving rollers are heated, and also the drum is heated from upside with infrared heater.

With respect to casting using casting machine, a predetermined amount of polyamic acid solution is injected into inside of the drum with slow rotation to obtain a polyamic acid tubular film with a desired thickness. After injection of predetermined amount of the solution, rotation of revolving roller is gradually accerelated with heat. When rotation speed reaches a necessary one, the rotation number is maintained for predetermined time period with heating the entire drum. Heating temperature is preferably about 100–190° C. to improve casting and remove organic polar solvent by distillation and inhibit imide ring closure as much as possible. Since necessary rotation speed of drum is varied depending on temperature, viscosity of solution and the like, specific conditions may be determined by preliminary test.

It is preferable that polyamic acid film is free of solvent. However, solvent may be remained therein.

With respect to outer layer film, a tubular film with desired shape (diameter) having a thickness of about 5–20 μm is prepared by extrusion molding with melt extruder provided with ring die using powder or pellet of the fluororesin. Molding temperature is varied according to types of resin. In general, temperature of ring die is set at about 360–430° C., and temperature of extruder barrel is set at about 280–380° C. Inner diameter of outer layer film has to be larger than outer diameter of base film for fitting. However, too large inner diameter is not preferable. The relationship is determined according to the shrinkage factor of outer layer film as shown above. In general, the outer layer film is molded in order that the clearance is between 0.05 mm and 1 mm.

The outer layer film is preferably stretched about 2–10%, preferably about 4–8% in circumferential direction (TD direction). This is because outer layer film fitted on the outside of base film may be anchored by contraction with heat in TD direction.

Stretch in longer direction is optional.

The polyamic acid film and outer layer film as shown above is fitted and anchored. Specifically, outer layer film is fitted on the outside of polyamic acid film which is fitted on metallic mandrel.

Temperature of the whole is gradually elevated under normal or reduced pressure. The upper limit of temperature is preferably a temperature at which outer layer film is not melted and flowed, and which imide ring closure reaction is completed. The upper limit of temperature is about 300–400° C. Heating time is about 10–30 minutes.

The above mentioned methods for fitting and anchorage are preferable, since imide ring closure reaction and anchorage are progressed simultaneously leading to firm anchorage of them and improvement of productivity. However, polyamic acid film placed on mandrel may be converted into base film by completion of imide ring closure, subsequently outer layer film may be fitted on the outside of base film and heated for anchorage. In this case, outer layer film may be heated at temperature high enough to contract and anchore the outer layer film, for example, about 200–400° C.

Production procedure using thermal conductive inorganic powder and electrical conductive powder is shown below.

The procedure is conducted in the same manner as above except that the liquid polyamic acid comprises 5–30% by weight (based on the amount of polyamic acid) of thermal conductive inorganic powder and the fluororesin comprises 4–15% by weight (based on the amount of fluororesin). Viscosity of liquid polyamic acid in centrifugal casting, conditions in centrifugal casting and conditions in molding of outer layer film are a little changed by mixing said powders. Sufficient preliminary examinations are preferable.

Blending liquid polyamic acid and thermal conductive inorganic powder is preferably performed using ball mill, high-speed mixer, etc. for sufficient stirring and blending. Sufficient blending and dispersion is preferable with respect to fluororesin and electrical conductive powder. For this purpose, blended mixture with twin-screw extruder is preferably subjected to molding.

Dispersed conditions of thermal conductive inorganic powder in base film is varied according to molding methods. For example, centrifugal casting preferably performed in the invention has a tendency of gradient dispersion toward surface portion. As alternative method, a casting method for seamless molding conducted by casting the blend on the surface of drum results in uniform dispersion as a whole. The invention does not depend on the dispersion conditions. However, gradient dispersion is more preferable for more efficient thermal conductivity in considering properties of film.

Use application of the seamless tubular composite film thus obtained is variable and is not specifically limited. For example, the film may be used as heating roller and heating belt (tube) for heat carrier. Specifically, heating roller and heating belt (tube) are used as members of fusing roller or fusing belt (tube) of toner image on subject (paper or film) in electrophotographic copying machine and laser printer. They are superior because of release characteristics to toner image leading to capability of high-speed reproduction, thereby preferable.

When applied to members of fusing roller or fusing belt (tube), the composite film is placed and fixed on aluminum tube as core material with respect to fusing roller. Heating may be performed indirectly by locating heating means within the aluminum tube. With respect to fusing belt (tube), heating means for the belt or tube are located directly inside of belt or tube.

BEST MODE FOR CARRYING OUT THE INVENTION

The invention will be described below in detail with comparative examples.

Example 1

A seamless tubular polyamic acid film to be converted into base film was molded.

Condensed polymerization reaction of equivalent of pyromellitic dianhydride and 4,4'-diaminodiphenylether was conducted in N-methylpyrrolidone at normal temperature (20° C.) to obtain 200 g of polyamic acid solution (solid matter concentration 18% by weight) (hereinafter referred to as "solution A").

Solution A (5.2 g) was diluted by adding N-methylpyrrolidone thereto to be a sollid matter concentration of 10% by weight (hereinafter "solution B").

Centrifugal casting machine was prepared by placing a metallic drum having a width of 440 mm and a inner diameter of 24.5 mm whose inner surface was planished, on two revolving rollers so as to rotate the drum with rotation of the rollers. The casting machine was contained in a heating apparatus capable of temperature regulation to enable the casting machine to be heated.

Ring flames (2 mm in width and 2 mm in height) for inhibiting leakage of liquid were located at both inner ends. 9.3 g of solution B was taken and injected with slowly rotating metallic drum of centrifugal casting machine at normal temperature for spreading solution B uniformly on inner surface of the drum.

After completion of injection, rotating speed was increased to 330 rpm at the time of which entire casting machine was gradually heated by operating heater. Heating was stopped after 45 minutes of rotation. Rotation was stopped when cooled to room temperature as a whole. Molded product was released and removed from inner surface of the drum. The molded product thus obtained was a seamless tubular polyamic acid film which was 30±0.5 µm in thickness, 24.45 mm in outer diameter and 440 mm in width. The surface of the film is very smooth like mirror surface.

N-methylpyrrolidone as solvent was remained about 50% in the film.

Outer layer film was molded as shown below.

As fluororesin, copolymer of tetrafluoroethylene and perfluoroalkylvinylether in powder form was feeded into single screw extruder provided with tubular die (die temperature was adjusted to 390° C.) for extrusion molding, and then continuously stretched 6% in circumferential direction and substantially equal to or less than 1% in longer direction at drawing temperature of 250° C. to obtain outer layer film.

The resulting outer layer film was 10±0.5 µm in thickness and 24.50 mm in inner diameter.

The seamless tubular polyamic acid film was fitted on metallic mandrel having an outer diameter of 23.95 mm and a width of 400 mm in width, which was planished and treated to form an enormous number of small holes. Said outer layer film was fitted on the outside thereof. The clearance between them was 0.05 mm.

The whole was placed in hot-air drying chamber, gradually heated to 350° C. over a period of 180 minutes, further heated at the temperature, 350° C., for 15 minutes, and then cooled and taken out from the drying chamber. Finally, seamless tubular composite film was obtained by removing the film from mandrel. The resulting composite film was 30±1 µm in thickness and 24.0 mm in inner diameter. The outer layer film was completely adhered and fixed to base film. The outer layer film had no pinhole and like irregularity and was mirror-smooth. The outer layer film had a degree of roughness (Rz, 10 points average roughness) of 0.50 µm.

A part of the composite film was cut and subjected to infrared absorption spectrum analysis confirming that no amide group was assigned and only imide group was assigned.

Example 1

According to example 1, solution A (5.2 g) was taken, to which boron nitride (0.23 g; particle diameter 0.25 µm) having high thermal conductivity and N-methylpyrrolidone (6.2 g) were added. The mixture was stirred and mixed with ball mill, and then deaerated in vacuo to obtain a polyamic acid solution containing boron nitride (hereinafter referred to as solution C).

The solution C was injected into rotating drum in the same conditions as example 1 for molding using centrifugal casting machine and finally released from the drum.

The resulting molded product was a seamless tubular polyamic acid film containing gradient-dispersed boron nitride having a thickness of 31±0.5 µm, an outer diameter of 24.45 mm and a width of 440 mm. The surface thereof was very smooth as example 1.

Outer layer film was molded according to the following conditions.

Powdered copolymer of tetrafluoroethylene and perfluoroalkylvinylether as fluororesin was mixed with 8 % by weight carbon black (OIL FARNES BLACK type MA-100; Mitsubishi Kasei Kogyo), and was stirred and dispersed with high-speed mixer. The mixture was subjected to extrusion molding in the same conditions as example 1 using the single screw extruder provided with ring die.

The resulting outer layer film was 10±0.5 µm in thickness and 24.50 mm in inner diameter. The surface thereof was very smooth as example 1.

The seamless tubular polyamic acid film in which boron nitride was dispersed was fitted on metallic mandrel used in example 1. Said outer layer film in which carbon black was dispersed was fitted thereon. The clearance between them was 0.05 mm.

The whole was placed in hot-air drying chamber, gradually heated to 350° C. over a period of 180 minutes, further heated at the temperature, 350° C., for 15 minutes, and then cooled and taken out from the drying chamber. Finally, the film was removed from mandrel.

The resulting composite film was 31±1 µm in thickness and 24.0 mm in inner diameter and 0.75 µm in a degree of roughness (Rz) The outer layer film was completely adhered and fixed to base film.

Electrical surface resistance thereof was at level of $10^{11}$ Ω/□.

Comparative Example 1

A seamless tubular polyamic acid film in which boron nitride was dispersed was obtained in the same manner as example 2. The film was fitted on metallic mandrel. The film was coated by using fluid dispersion of fluororesin with rotating the mandrel. Specifically, the aqueous dispersion contained powdered copolymer of tetrafluoroethylene and perfluoroalkylvinylether (30% by weight) used in example 1 and carbon black (8% by weight), a small amount of dispersant and water (the rest). Coating was performed in such conditions that the thickness of resin layer after drying became 10 μm.

The whole comprising the film fitted on the mandrel was placed in hot-air drying chamber, gradually heated to 350° C. over a period of 180 minutes, further heated at 350° C., for 15 minutes for completion of imide ring closure reaction and film formation by baking the coating layer comprising the fluorine-containing copolymer. The resulting composite film was 1.90 μm in a degree of roughness (Rz) and 30±2 μm in thickness with respect to all parts of the film, which shows larger scattering of film thickness.

Comparative Example 2

Seamless tubular composite films obtained in example 2 and comparative example 1 which were cut to have a width of 300 mm were attached to heat-fusing section of laser printer by roll mechanism for testing fusing performance and durability of toner image.

The roll mechanism is roughly shown in FIG. 1. 1 was a seamless tubular composite film obtained in example 2 or comparative example 1. Circular arc-like ceramic heater 2 was attached to inside thereof to heat inside of film 1. 5 was a rotating shaft attached to a ring fixed one side of the film 1. The rotating shaft 5 was connected with rotating and driving gear (not shown) which was separately placed. When the driving gear was rotated, the film 1 was slipped on the surface of ceramic heater 2. 3 was a back-up roll which was in front of ceramic heater 2. A paper 4 to which toner image formed by laser source was transferred was heated by the surface of film (heat for fusing toner) and pressed by the roll 3 for completion of fusing.

The test was conducted by printing a paper with 600 dpi laser printer which was set at a ceramic heater temperature of 200° C. and printing rate of 8 piece/min using test chart in which lines with a width of 4 dots were formed at 20 dots interval as manuscript. The results demonstrated that the film of example 2 was excellent in strength, high-temperature resistance, release properties, capable of use as much as about 200,000 pieces of paper with good offset properties. In contrast, the film of comparative example 1 caused offset failure in a test using about 50,000 pieces of paper and partial release of fluororesin film observed by taking out the film.

The invention constituted as above exerts the following effects.

First, free of expansion and contraction and very low decrease of strength (Young's modulous and like mechanical strength) under conditions of rotation use at high temperature (about 200° C.) for a long period of time. This is an effect which can not be obtained by any other resin.

Since surface layer is formed by seamless tubular film, adhesion strength with base film, accuracy of thickness, surface smoothness and release properties are excellent. Stable heat-fusing properties for a long time may be obtained by using the composite film as toner fusing member of an electrophotographic copying machine, laser printer, etc.

Since thermal conductivity and antistatic properties are imparted, the film may reach a predetermined temperature rapidly, and adhesion of dust onto the surface thereof is difficult.

What is claimed is:

1. A seamless tubular composite film characterized in that a seamless tubular film comprising a fluororesin with a thickness of 5–20 μm stretched 2–10% in at least a circumferential direction is fitted and fixed on the outside of a seamless tubular film comprising a thermosetting polyimide resin, wherein said seamless tubular film comprising fluororesin is produced by extrusion molding with a tubular die.

2. The seamless tubular composite film according to claim 1 wherein the seamless tubular film comprising a thermosetting polyimide resin has a thermal conductive inorganic powder dispersed therein, and the seamless tubular film comprising fluororesin has an electrical conductive powder dispersed therein.

3. The seamless tubular composite film according to claim 1 wherein the seamless tubular film comprising a thermosetting polyimide resin has a thickness of 10–100 μm.

4. The seamless tubular composite film according to claim 1 wherein the seamless tubular film comprising fluororesin with a film thickness of 5–20 μm is a seamless tubular film with a film thickness of 7–15 μm comprising fluorine-containing copolymer resin having a melting point of 250–400° C.

5. The seamless tubular composite film according to claim 4 wherein fluorine-containing copolymer resin having a melting point of 250–400° C. is a copolymer of tetrafluoroethylene and hexafluoropropylene or perfluoroalkylvinylether.

6. The seamless tubular composite film according to claim 2 wherein thermal conductive inorganic powder is selected from the group consisting of boron nitride, aluminum oxide, beryllium oxide and aluminum nitride.

7. The seamless tubular composite film according to claim 2 wherein the electrical conductive powder is carbon black or a blend of carbon black and metallic powder.

8. The seamless tubular composite film according to claim 1, having an average surface roughness (Rz) of about 0.50 μm on the outside of the fluororesin.

* * * * *